United States Patent [19]
Wier

[11] Patent Number: 5,927,756
[45] Date of Patent: Jul. 27, 1999

[54] SAFETY BELT TIGHTENER

[75] Inventor: Franz Wier, Göggingen, Germany

[73] Assignee: TRW Occupant Restraint Systems GmbH, Alfdorf, Germany

[21] Appl. No.: 08/842,153

[22] Filed: Apr. 23, 1997

[30] Foreign Application Priority Data

Apr. 23, 1996 [DE] Germany ............... 296 07 362 U

[51] Int. Cl.⁶ .................................. B60R 22/46
[52] U.S. Cl. .................. 280/806; 297/480; 60/632
[58] Field of Search .................... 280/806; 297/480; 242/374; 60/632, 635, 638

[56] References Cited

U.S. PATENT DOCUMENTS

| | | | |
|---|---|---|---|
| 3,888,085 | 6/1975 | Larsonneur | 280/806 |
| 3,942,819 | 3/1976 | Schwanz et al. | 297/480 |
| 4,008,909 | 2/1977 | Otani et al. | 297/480 |
| 4,258,934 | 3/1981 | Tsuge et al. | 280/806 |
| 4,458,921 | 7/1984 | Chiba et al. | 280/806 |
| 5,553,890 | 9/1996 | Buhr et al. | 280/806 |
| 5,568,940 | 10/1996 | Lane, Jr. | 280/806 |

FOREIGN PATENT DOCUMENTS

| | | | |
|---|---|---|---|
| 0205901 | 12/1986 | European Pat. Off. | |
| 4020600 | 1/1991 | Germany . | |
| 42 32 569 | 3/1994 | Germany | 280/806 |
| 1381753 | 1/1975 | United Kingdom . | |

Primary Examiner—Peter C. English
Attorney, Agent, or Firm—Tarolli, Sundheim, Covell, Tummino & Szabo

[57] ABSTRACT

A safety belt system comprises a belt buckle and a belt tightening device adapted to act on the belt buckle via a traction cable. The belt tightening device includes a piston/cylinder unit to be operated by a gas generator and secured to the vehicle body or to a vehicle seat. The directions of movement of the belt buckle and of the piston are the same when the belt tightening device is activated.

15 Claims, 8 Drawing Sheets

SAFETY BELT TIGHTENER

TECHNICAL FIELD

The invention relates to a safety belt system for vehicles.

BACKGROUND OF THE INVENTION

With the safety belt system disclosed in U.S. Pat. No. 4,917,210 the piston/cylinder unit is attached in a parallel manner to the vehicle floor and possesses a cable deflection means mounted on an end wall of the cylinder. The cable deflection means has the purpose of redirecting the traction cable, which is caused to extend parallel to the cylinder where it is near the cylinder, obliquely upward in the force direction of the safety belt which is to be connected with the belt buckle. The known safety belt system has, however, a very large overall size, something which is a particular disadvantage in view of the shortage of space available adjacent to the belt buckle anchoring means.

BRIEF SUMMARY OF THE INVENTION

The invention provides a safety belt system requiring less space. In accordance with the invention the safety belt system comprises a belt buckle with a housing, a traction cable and a belt tightening device adapted to act on the belt buckle via the traction cable. The belt tightening device includes a piston/cylinder unit having a piston, a cylinder and a gas generator. The piston and the belt buckle are displaceable each in a direction of movement upon activation of the gas generator, wherein the directions of movement being the same.

Accordingly the cable deflection means, which is otherwise necessary, may become unnecessary and the safety belt system has a reduced axial length.

From the British Patent Publication No. 1,381,753 a safety belt system is known in which the belt buckle is moved in the same direction as the piston when the belt tightening device is activated. The belt buckle is, however, secured directly to a rigid piston rod with an oversize length. The piston rod is hence likely to be bent by accidental strikes, occurring for instance during cleaning of the vehicle, so that the belt tightening movement in case of a vehicle crash is impeded or even completely prevented. Contrary thereto, the invention does not involve having any rigid, non-flexible connection between the belt buckle and the piston but uses a connection in the form of a traction cable which additionally offers the advantage of being able to adapt its position to the run of the safety belt adjacent to the belt buckle, such run depending on the particular stature of the vehicle occupant.

In order to produce an even further simplification of the structure of the novel safety belt system it is, in accordance with a preferred embodiment, provided that the gas generator has a gas generator housing adjacent to an end wall of the cylinder, the end wall facing the belt buckle, and that the traction cable extends through an opening in the end wall to the piston. Accordingly lateral chambers, in which pyrotechnical material is arranged and which are connected with the interior of the cylinder, are now no longer required on the cylinder.

In accordance with one embodiment of the invention, the gas generator housing is a part of the cylinder or, vice versa, the cylinder is a part of the gas generator housing so that there is also a saving in space. Furthermore, a seal surrounding the traction cable is preferably provided in an opening in the cylinder and/or in the gas generator housing.

Since the traction cable extends into the interior of the cylinder, it also extends through the end wall of the cylinder, and, if the gas generator housing adjoins to the end wall or is a part of the cylinder, through the gas generator housing as well. Owing to the provision of a seal in this part there is no possibility of outward leakage at the opening during ignition of the pyrotechnical material.

It is, furthermore, possible for the gas generator to be arranged in the interior of the cylinder, something which saves space. In the case of this design the cylinder may constitute as well a part of the gas generator housing or, conversely, the gas generator housing may be a part of the cylinder.

The safety belt system may b e made even more compact, if, in accordance with the preferred embodiment, the traction cable is connected to the belt buckle by using a rope socket on the belt buckle and the rope socket penetrates the end wall of the piston and cylinder unit after activation of the belt tightening device. In all designs of safety belt systems so far proposed, the rope socket is always fully outside the cylinder when the belt tightening device is activated in order not to damage the cylinder. Since, however, after activation of the belt tightening device, when the rope socket is shifted close to the end wall of the cylinder, the impetus caused by the pyrotechnic material has already been largely transmitted to the piston, the rope socket is also able to penetrate through the end wall without this impairing the function of the safety belt system of the invention. If the gas generator housing is a part of the cylinder or, vice versa, the cylinder is a part of the gas generator housing, the rope socket will also penetrate through the gas generator housing.

It is furthermore possible for the design to be such that the rope socket penetrates the cylinder until the housing of the belt buckle abuts the end wall of the piston and cylinder unit, this being a simple way of limiting t he shift, due to the belt tightening device, of the piston and the belt buckle.

An ignition unit may be arranged adjacent to the end wall, facing the belt buckle, of the gas generator housing, the traction cable extending right through an opening in the ignition unit to the piston. As an alternative the ignition unit can be secured to the cylinder jacket and be connected via a lateral opening in the same and in the gas generator housing in the cylinder with a space containing the pyrotechnical material.

The cylinder itself is preferably pivotally attached to the vehicle's body or to a vehicle seat, the cylinder jacket having a laterally projecting attachment lug molded on it for this purpose, this reducing the axial overall length thereof. Furthermore it is also possible to provide a male screw thread on the cylinder jacket for the attachment thereof in the screw threaded hole in the vehicle floor so that the cylinder is partially concealed in the vehicle floor and even less space is required in the interior of the vehicle.

In order to facilitate making a seal between the traction cable and the end wall of the cylinder, the traction cable is surrounded by a sheath possessing a circularly cylindrical exterior peripheral surface. This means that on activation of the belt tightening device and following displacement of the traction cable there will be furthermore no unnecessary, premature damage to the optionally provided seal by a traction cable having a rough exterior surface.

DETAILED DESCRIPTION OF PREFERRED EMBODIMENTS

Figure 1:
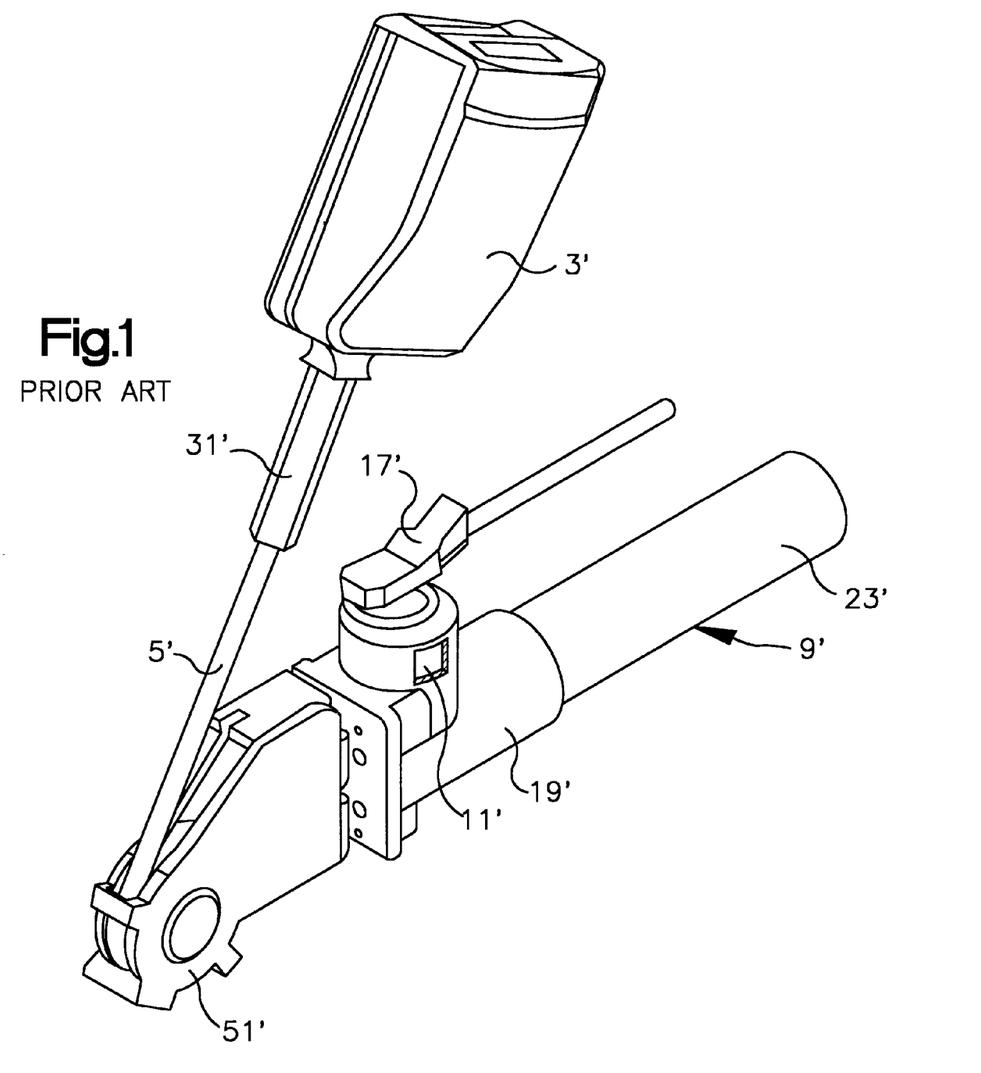
FIG. 1 shows a so far conventional safety belt system with a traction cable deflection means.

In FIG. 1 the reader will see a safety belt system as frequently installed in vehicles up till the present time, comprising a belt buckle 3', which is connected via a rope socket 31' with a traction cable 5', which for its part is connected with a piston, not illustrated, located in a cylinder 23'. Together with the piston the cylinder 23' constitutes a piston/cylinder unit 9', which is able to be activated using a gas generator 11'. In this respect the gas generator 11' is mounted in the interior of a customized cylindrical chamber in a gas generator housing 19', which is adjacent to a front end wall, not illustrated, in the cylinder 23'. An ignition unit 17' is connected with the pyrotechnic material of the gas generator 11' in order to ignite same. On the front end of the gas generator housing 19' a traction cable deflection means 51' is provided which serves to direct the traction cable 5', which would otherwise run parallel to the vehicle floor, in an upward direction.

Since, when the belt tightening device is activated, a radial force acts on the traction cable deflection means 51' and possibly on the cylinder 23', the traction cable deflection means 51' and the cylinder 23' must be secured to the vehicle body or a vehicle seat by a plurality of attachment means, not illustrated.

Figure 2:
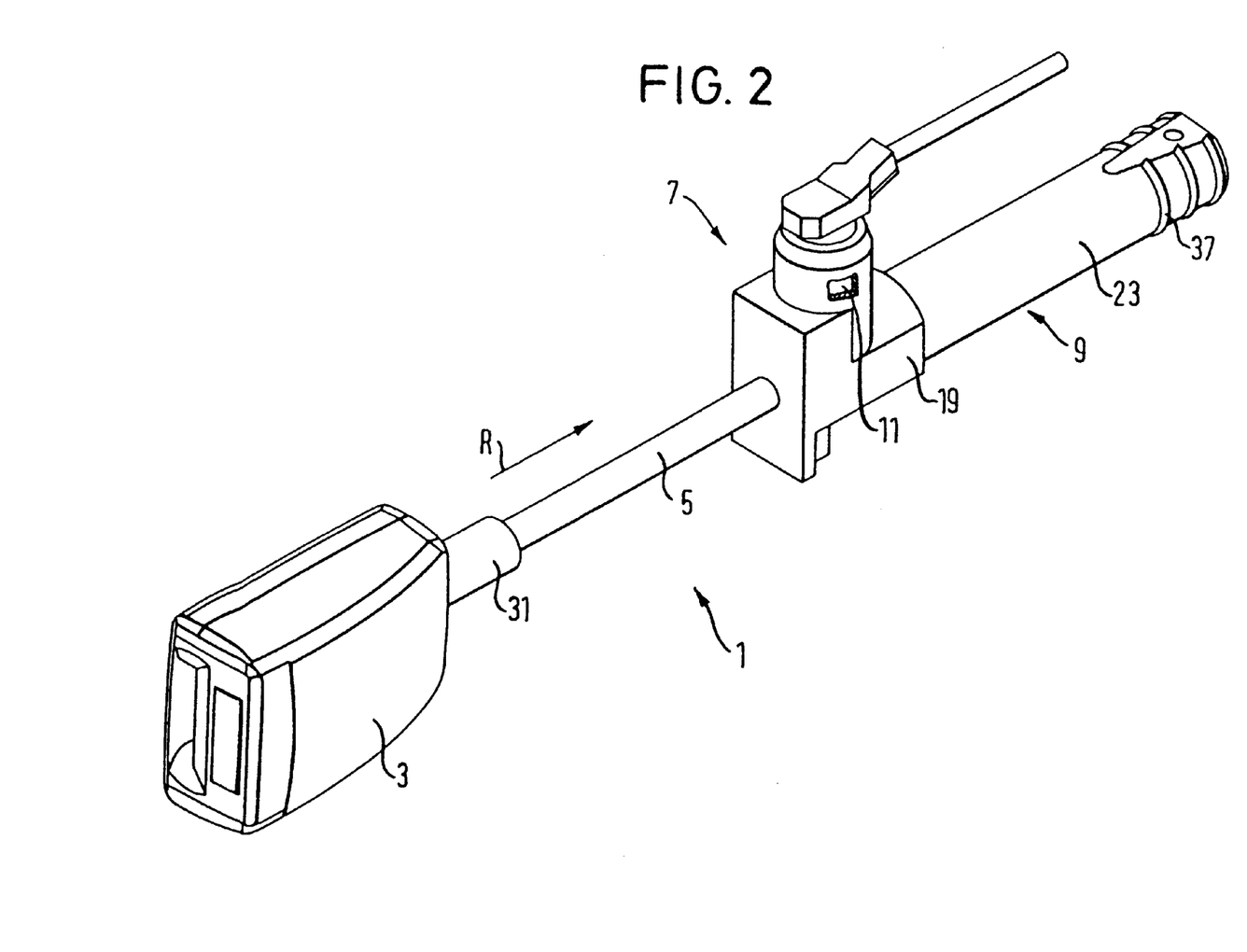
FIG. 2 shows a first embodiment of the safety belt system of the invention without activation of the belt tightening device.
Figure 3:
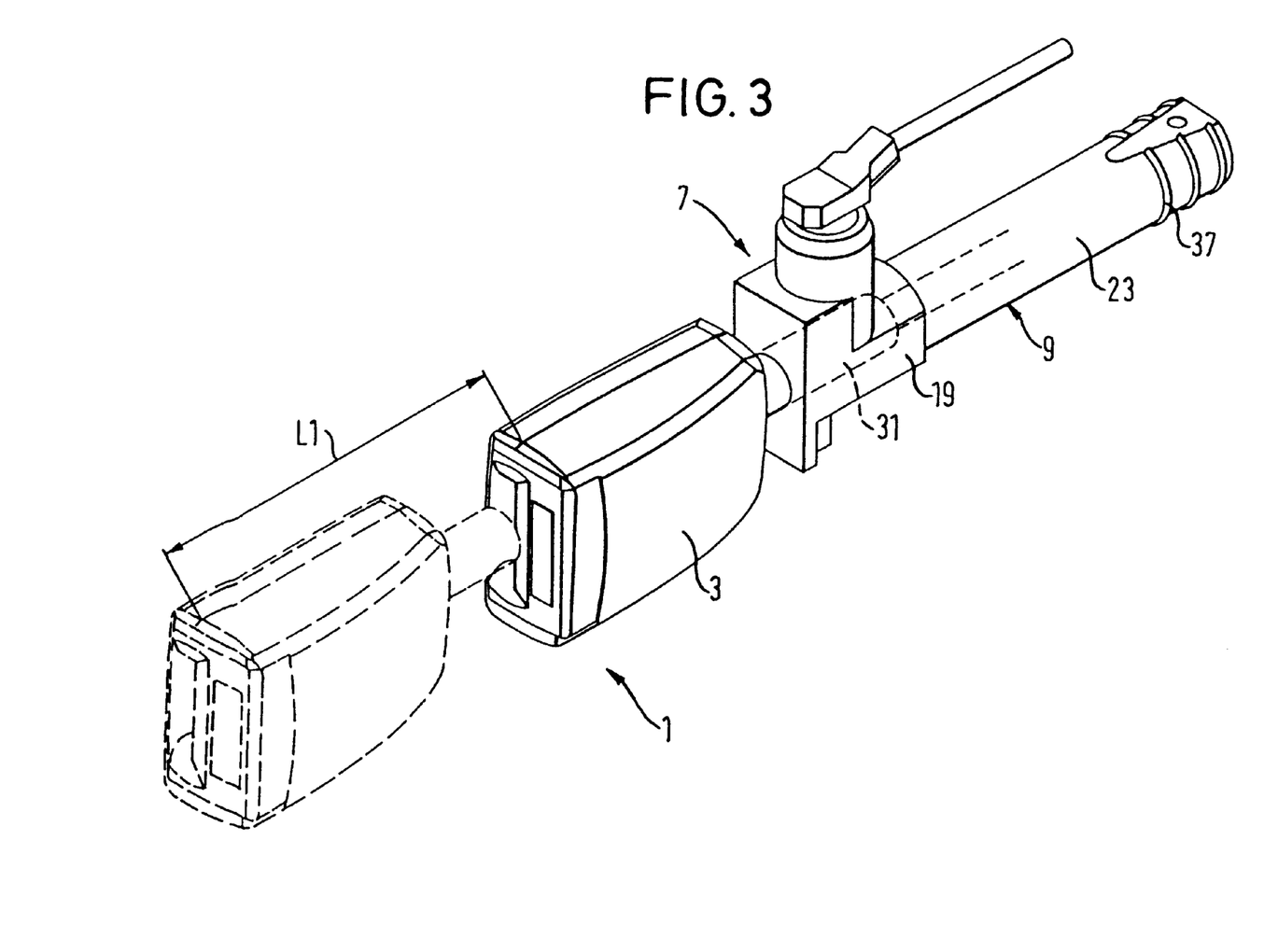
FIG. 3 shows the safety belt system of FIG. 2 with the belt tightening device activated.

The safety belt system 1 illustrated in FIGS. 2 and 3 has a substantially smaller overall size, more particularly in the axial direction, than the one illustrated in FIG. 1, since the directions of movement of the belt buckle 3 and of the piston, arranged in the cylinder 23, of a piston/cylinder unit 9, are the same. The direction of motion of the belt buckle 3 is in this respect indicated by the arrow R when the belt tightening device 7 is actuated. At the end of the cylinder 23, opposite to the belt buckle 3, the cylinder 23 possesses a male screw thread 37 on its outer peripheral surface or jacket to allow the belt tightening device 7 together with the belt buckle 3 to be screwed into a suitable threaded hole in the floor of the vehicle so that only a part of the cylinder 23 projects out of the hole into the vehicle's interior.

In FIG. 3 the original position of the belt buckle 3 is indicated in broken lines in the case of a non-activated piston/cylinder unit 9 and in continuous lines the position of the belt buckle 3 is illustrated after activation of the piston/cylinder unit 9. L1 indicates the maximum tightening displacement. It will be seen here that the rope socket 31, which connects the belt buckle 3 with the traction cable 5, moves into the gas generator housing 19, when gas generator 11 is actuated, at the end thereof, and even extends right through the same and also through an end wall, not to be seen in this view, of the cylinder 23 into the interior of the cylinder 23.

Figure 4:
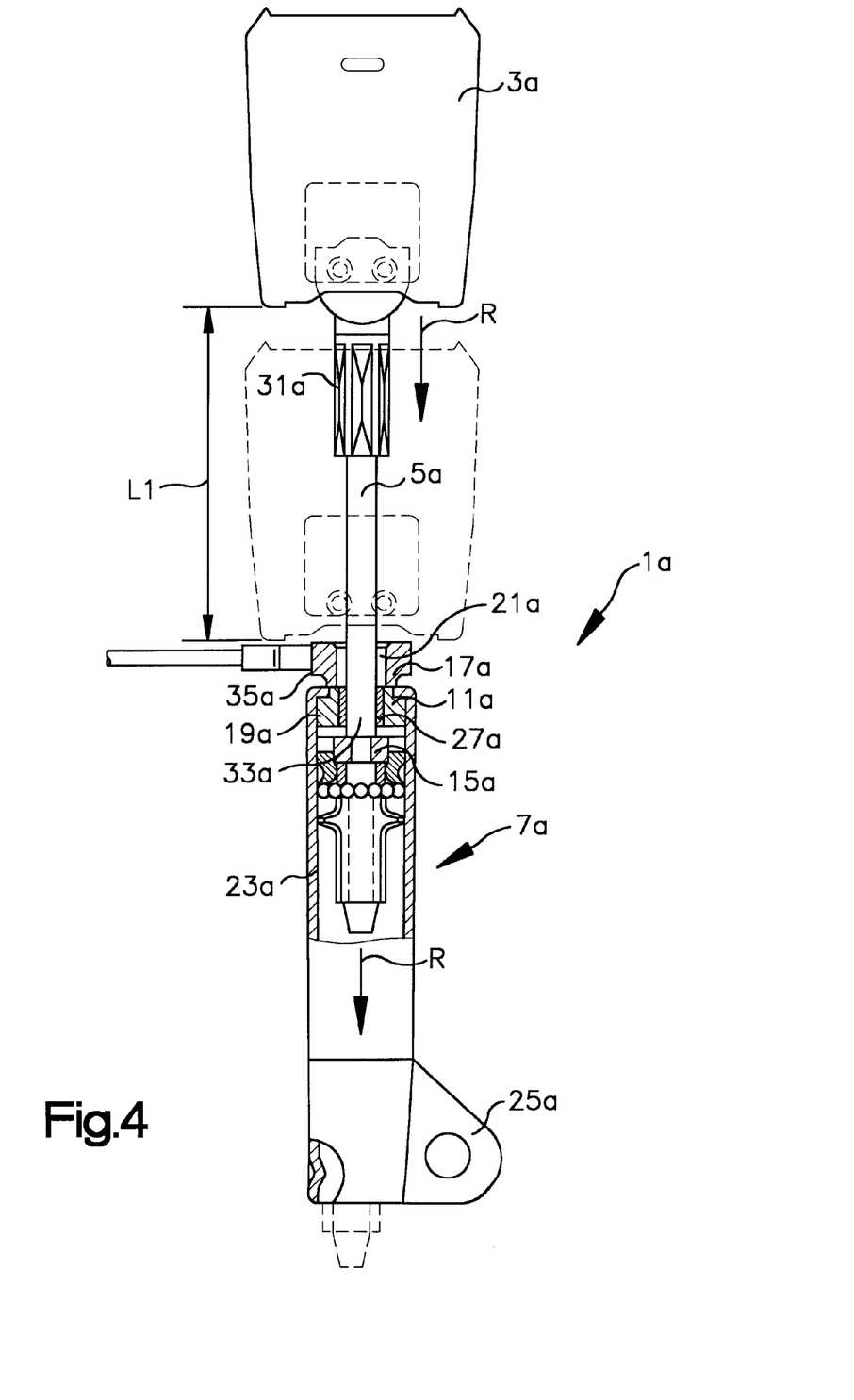
FIG. 4 shows a partial longitudinal section taken through a second embodiment of the safety belt system according to the invention.

In the case of the embodiment illustrated in FIG. 4 the belt buckle 3a is illustrated in continuous lines, when the belt tightening device 7a is not activated, and in broken lines when the belt tightening device 7a is activated. In the case of this form of embodiment of the safety belt system 1a the gas generator 11a is arranged in the interior of cylinder 23a, in which a cartridge-shaped generator housing 19a is adjacent to an end wall 35a of the cylinder 23a. The end wall 35a is partially constituted by the cylinder and partially by a corresponding end wall of the gas generator housing 19a so that the belt tightening device 7a has a shorter overall axial length, since there are not two axially adjacent end walls provided. The gas generator housing 19a, which is arranged to be coaxial to the cylinder 23a, has a central opening 33a, through which the traction cable 5a extends as far as the piston 15a, to which it is fixed. In the opening 33a a seal 27a surrounding the traction cable 5a is furthermore provided. In order to produce a satisfactory sealing action between the traction cable 5a and the seal 27a the traction cable 5a has a casing, which has a circularly cylindrical exterior peripheral surface. Adjacent to the end wall 35a of the gas generator housing 19a there is an annular ignition unit 17a with a central opening 21a, through which the traction cable 5a extends to the piston 15a. The ignition unit 17a may furthermore have a U-like or semicircular form.

The cylinder 23a is held on the vehicle body or on a vehicle seat using an attachment lug 25a molded on the peripheral outer surface of the cylinder 23a and projecting to the side. The attachment lug 25a permits a small pivoting motion of the cylinder 23a so that same may adapt itself somewhat to the direction of the safety belt.

After ignition of the pyrotechnic material located inside the gas generator housing 19a by the ignition unit 17a, acting by means of the traction cable 5a the piston 15a draws the belt buckle 3a toward the cylinder 23a in the direction R, and at the end of this movement the rope socket 31a penetrates the end wall 35a, which also constitutes the end wall of the cylinder 23a of the gas generator housing 19a. The rope socket 31a accordingly extends into the interior of the cylinder 23a. Despite the small axial overall size of the safety belt system 1a there is a large tightening displacement L1.

Figure 5:
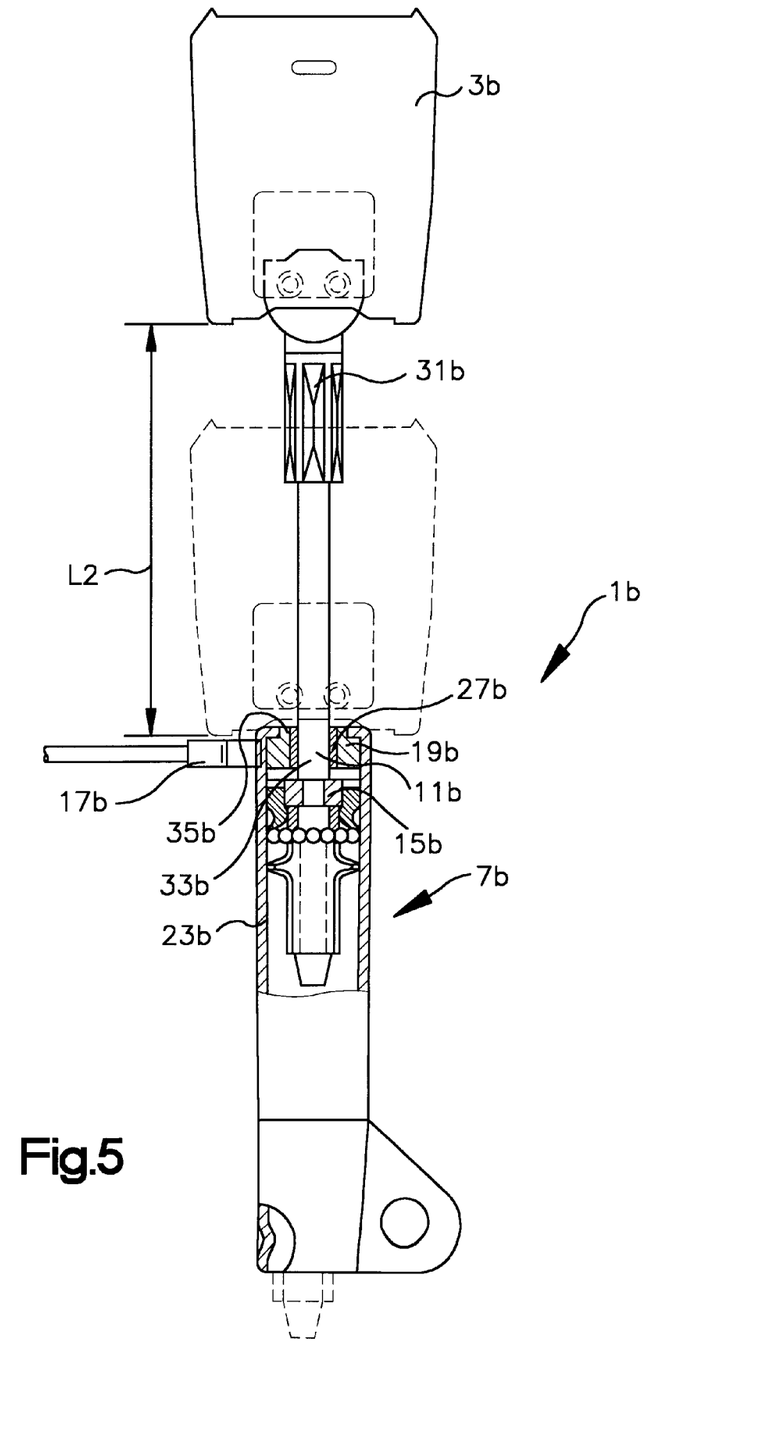
FIG. 5 shows a partial longitudinal section taken through a third embodiment of the safety belt system according to the invention.

The third embodiment, illustrated in FIG. 5, of the safety belt system 1b is generally similar to the form of embodiment depicted in FIG. 4, but with the difference that the ignition unit 17b is secured on the cylinder jacket and is connected via a lateral opening in same and in the gas generator housing 19b, arranged within the cylinder 23b, with a space containing the pyrotechnic material. This means that the safety belt system 1b has an even smaller axial overall size. Furthermore for limiting the tightening displacement L2 the housing of the belt buckle 3b may abut the end wall 35b of the piston/cylinder unit. The remaining elements shown in FIG. 5 are the same as those in FIG. 4, but are designated by the suffix "-b" instead of the suffix "-a".

As a possible modification of the embodiment illustrated in FIG. 5 it would be feasible for the gas generator housing 19b to be exclusively constituted by suitably formed wall parts of the cylinder 23b.

The embodiments illustrated in FIGS. 2 through 5 of the safety belt system 1 are characterized by having a substantially more compact design, more particularly an axially shorter overall size, the belt tightening displacement being the same as in the known safety belt system of FIG. 1.

In FIGS. 6 through 11 alternative possibilities of attachment for the cylinder 23 are depicted.

Figure 6:
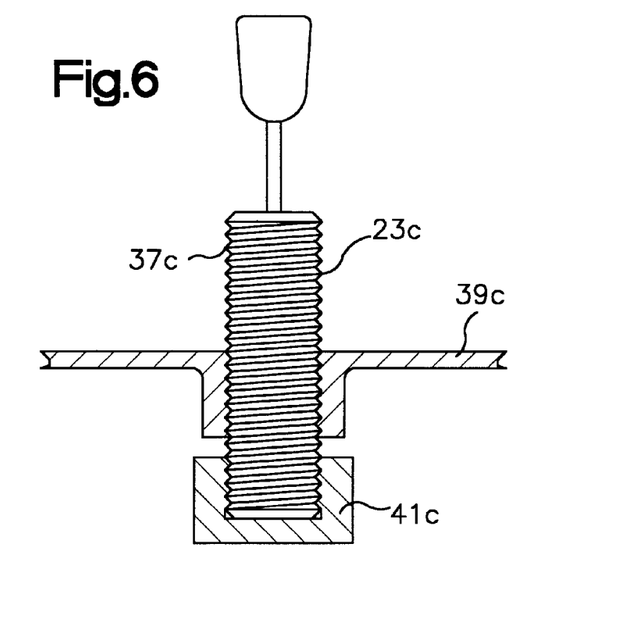
FIG. 6 and FIG. 7 show different possibilities for the attachment of the cylinder in the vehicle floor, in each case in longitudinal section.

In the possible method of attachment illustrated in FIG. 6 for the cylinder 23c in a vehicle floor 39c, the cylinder 23c has a male screw thread 37c and is screwed into an opening in the vehicle floor 39c. The cylinder 23c extends through the vehicle floor 39c and projects downward. The downwardly projecting end of the cylinder 23c has a protective cap 41c on it. The bottom end of the cylinder 23c and the protective cap 41c are so matched to one another that when the belt tightening device is activated the protective cap 41c is blasted off by the downwardly moving piston or the air displaced by same so that the necessary overall length of the cylinder 23c may be shortened.

Figure 7:
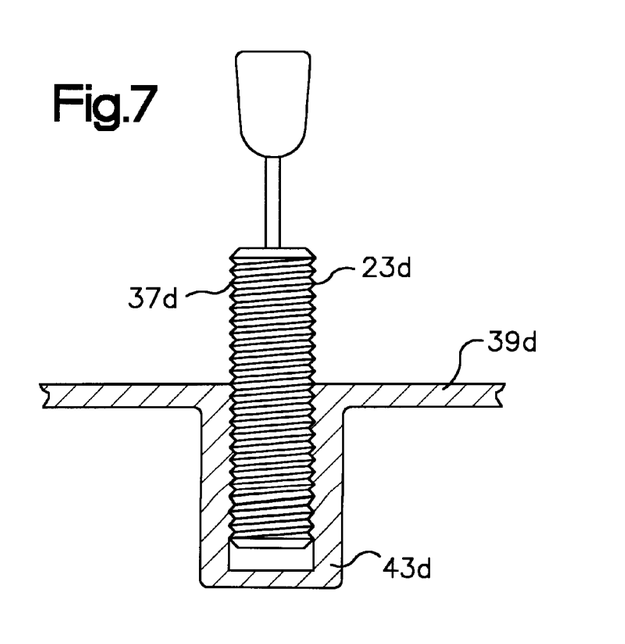

The possible form of attachment illustrated in FIG. 7 is characterized in that the cylinder 23d having the screw thread 37d is installed in a recess 43d formed in the vehicle floor 39d so that the cylinder is better protected from the vehicle floor side.

Figure 8:
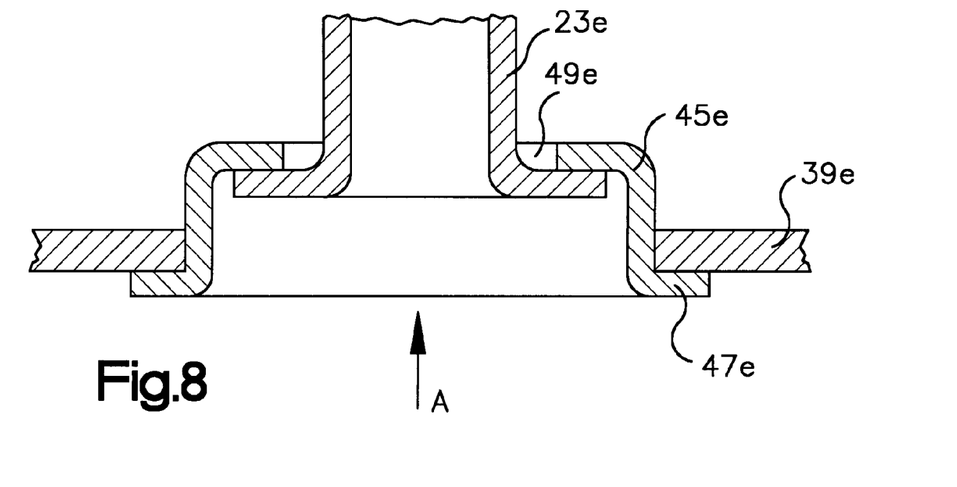
FIG. 8 shows a further possibility for the attachment of the cylinder in the form of a bayonet joint.
Figure 9:
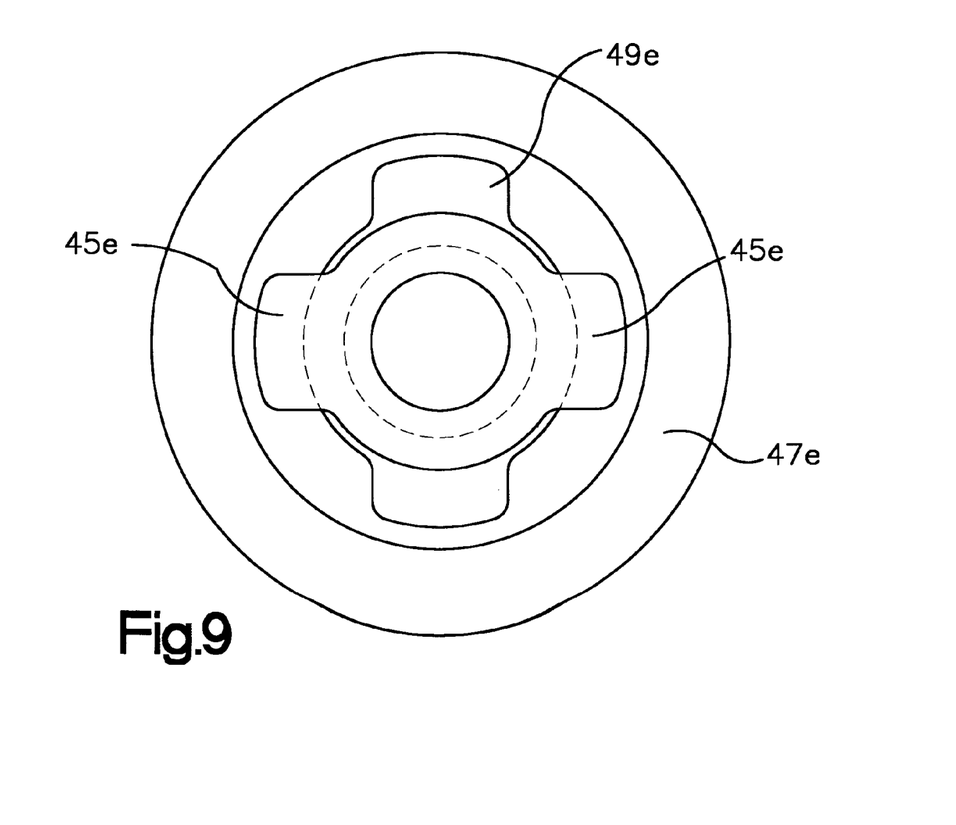
FIG. 9 shows a view of the bayonet joint of FIG. 8 looking in the direction of the arrow A.

In the embodiment as shown in FIGS. 8 and 9 the bottom end of the cylinder 23e is provided with two spurs 45e forming parts of a bayonet joint. The corresponding complementary part is in the form of a sleeve 47e secured in a hole in the vehicle floor 39e and having a complementary opening 49e via which the cylinder 23e may be introduced into the sleeve 47e.

Figure 10:
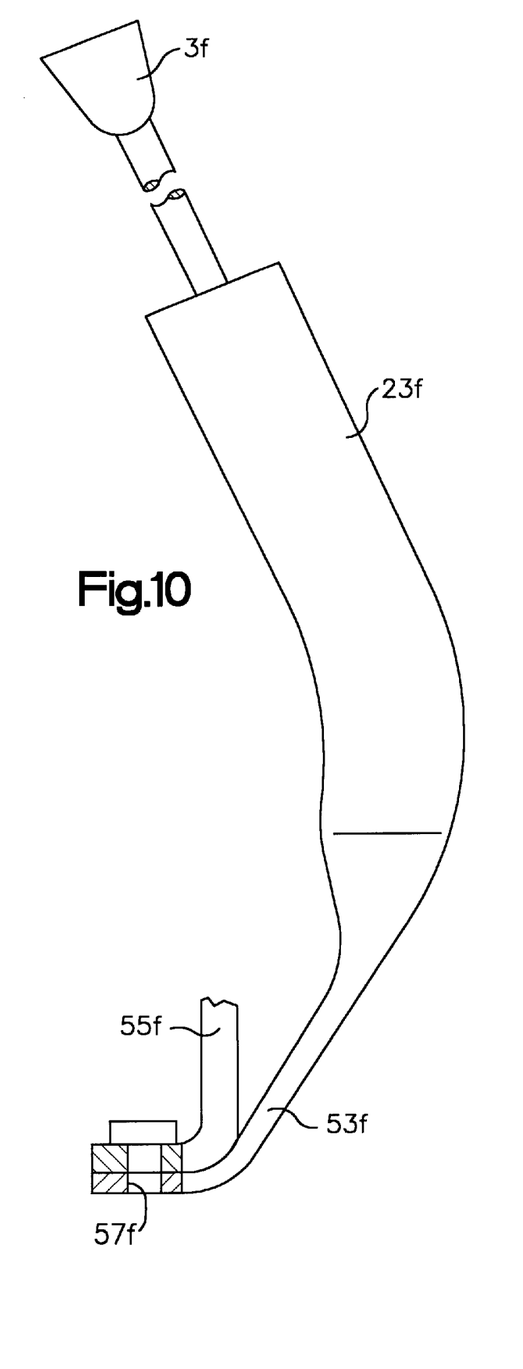
FIG. 10 shows a cylinder with a compressed and bent end for attachment on a vehicle seat in a longitudinal sectional view.
Figure 11:
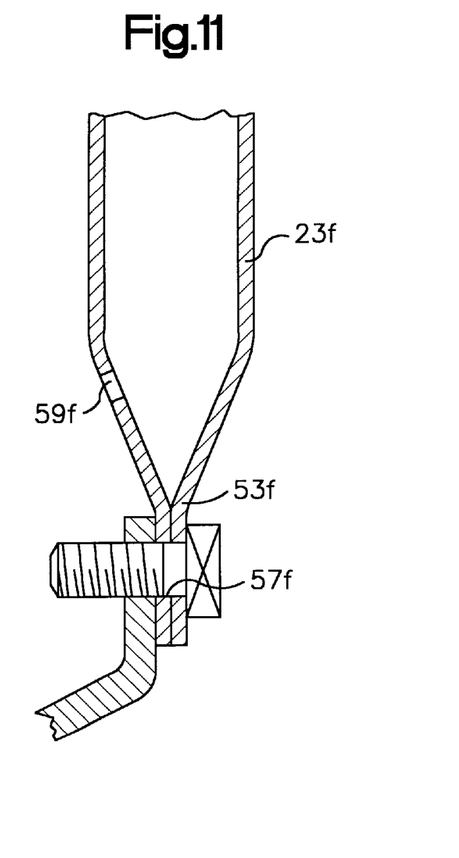
FIG. 11 shows a cylinder with a compressed, unbent end in a longitudinal sectional view.

A further economical possibility for securing the cylinder on the vehicle body or on a vehicle seat is depicted in FIGS. 10 and 11. In this case the rear end 53f of the cylinder 23f is compressed together as a two-ply plate, which provided with an opening 57f used to secure the cylinder 23f to the seat frame 55f. In order to reach a less accessible point of attachment the rear end 53f may in this case be bent as shown in FIG. 11, be straight.

Furthermore, it is also possible to provide at least one venting hole 59f adjacent to the non-compressed end of the cylinder 23f, through which the air displaced by the piston may escape so that the piston meets with the least possible resistance during its displacement of the belt buckle 3f.

I claim:

1. A safety belt system comprising:
   a belt buckle with a housing;
   a traction cable; and
   a belt tightening device adapted to act on said belt buckle via said traction cable;
   said traction cable being connected to said belt buckle by means of a rope socket;
   said belt tightening device including a piston/cylinder unit having a piston, a cylinder and a gas generator;
   said piston and said belt buckle being displaceable each in a direction of movement upon activation of said gas generator, said directions of movement being the same;
   said cylinder having an end wall with an opening facing said belt buckle;
   said gas generator having a gas generator housing adjacent to said end wall;
   said traction cable extending through said opening to said piston; and
   said rope socket penetrating said end wall of said cylinder upon activation of said belt tightening device until said housing of said belt buckle strikes said end wall of said cylinder.

2. The safety belt system as claimed in claim 1, wherein a seal surrounding said traction cable is provided, said seal being arranged in said opening of said end wall.

3. The safety belt system as claimed in claim 1, wherein a seal surrounding said traction cable is provided and wherein said gas generator housing has an opening through which said traction cable extends, said seal being arranged in said opening of said gas generator housing.

4. The safety belt system as claimed in claim 1, wherein the gas generator is arranged in the interior of said cylinder.

5. The safety belt system as claimed in claim 1, wherein said cylinder has a cylinder jacket and said gas generator housing is arranged within said cylinder and has a space in its interior which is filled with pyrotechnical material, said cylinder jacket and said gas generator housing having a lateral opening extending to said space, and wherein an ignition unit is provided which is secured to said cylinder jacket and is connected with said space via said lateral opening.

6. The safety belt system as claimed in claim 1, for a vehicle, wherein said vehicle has a vehicle body and at least one vehicle seat, said cylinder having securing means for securing said cylinder to one of said vehicle body and said vehicle seat, said cylinder being pivotally mounted on one of said vehicle body and said vehicle seat.

7. The safety belt system as claimed in claim 6, wherein said cylinder has a rear end which is pressed together as to form a two-ply plate which is provided with an opening defining part of said securing means.

8. The safety belt system as claimed in claim 1, wherein said cylinder has a cylinder jacket and wherein a laterally projecting lug is molded on said cylinder jacket.

9. The safety belt system as claimed in claim 1, wherein said cylinder has an attachment side and at least one venting hole on said attachment side thereof.

10. The safety belt system as claimed in claim 1, wherein said traction cable is provided with a casing attached thereto and having a circularly cylindrical outer peripheral surface.

11. A safety belt system for a vehicle having a vehicle body, said system comprising:
    a belt buckle with a housing;
    a traction cable; and
    a belt tightening device adapted to act on said belt buckle via said traction cable;
    said belt tightening device including a piston/cylinder unit having a piston, a cylinder and a gas generator;
    said piston and said belt buckle being displaceable each in a direction of movement upon activation of said gas generator, said directions of movement being the same;
    said cylinder having an end wall with an opening facing said belt buckle;
    said gas generator having a gas generator housing adjacent to said end wall;
    said traction cable extending through said opening to said piston; and
    said cylinder having securing means for securing said cylinder to said vehicle body;
    said vehicle body having a female screw thread and said cylinder having a cylinder jacket with a peripheral outer surface on which a male screw thread, which thread defines said securing means, for attachment of said cylinder by threadingly engaging said female screw thread is provided.

12. The safety belt system as claimed in claim 11, wherein said vehicle body comprises a vehicle floor with an opening including said female screw thread, wherein said cylinder has a rear end and wherein a protective cap on said rear end is provided, said cylinder projecting through said opening of said vehicle floor and said cap being adapted to be blasted off on activation of said belt tightening device.

13. The safety belt system as claimed in claim 11, wherein an ignition unit having an opening is provided, said ignition unit adjoining to said end wall, and wherein said traction cable extends through said opening in said ignition unit to said piston.

14. A safety belt system for a vehicle having a vehicle body, said system comprising:

a belt buckle with a housing;

a traction cable; and a belt tightening device adapted to act on said belt buckle via said traction cable;

said belt tightening device including a piston/cylinder unit having a piston, a cylinder and a gas generator;

said piston and said belt buckle being displaceable each in a direction of movement upon activation of said gas generator, said directions of movement being the same;

said cylinder having an end wall with an opening facing said belt buckle;

said gas generator having a gas generator housing adjacent to said end wall;

said traction cable extending through said opening to said piston; and said cylinder having securing means for securing said cylinder to one of said vehicle body and a vehicle seat, and said securing means being a bayonet joint.

15. The safety belt system as claimed in claim 14, wherein said vehicle body comprises a vehicle floor having a hole in which a sleeve is inserted, said cylinder having a bottom end with lateral spurs, and said sleeve and said spurs defining said bayonet joint.

* * * * *